US012210189B2

(12) United States Patent
Knight et al.

(10) Patent No.: US 12,210,189 B2
(45) Date of Patent: Jan. 28, 2025

(54) NANOIMPRINTED PHOTONIC INTEGRATED CIRCUITS

(71) Applicant: NORTHROP GRUMMAN SYSTEMS CORPORATION, Falls Church, VA (US)

(72) Inventors: Mark William Knight, El Segundo, CA (US); Stephanie Roxane Sandor-Leahy, El Segundo, CA (US); Lakshminarayanan Ravi Narasimhan, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 18/479,418

(22) Filed: Oct. 2, 2023

(65) Prior Publication Data

US 2024/0027687 A1 Jan. 25, 2024

Related U.S. Application Data

(62) Division of application No. 17/508,030, filed on Oct. 22, 2021, now Pat. No. 11,835,763.

(51) Int. Cl.
*G02B 6/136* (2006.01)
*G02B 6/12* (2006.01)

(52) U.S. Cl.
CPC .... *G02B 6/136* (2013.01); *G02B 2006/12038* (2013.01); *G02B 2006/12061* (2013.01); *G02B 2006/12176* (2013.01)

(58) Field of Classification Search
CPC .......... G02B 6/136; G02B 2006/12038; G02B 2006/12061; G02B 2006/12176; G02B 6/107; G02B 6/12002; G02B 6/12004; G02B 6/13; B82Y 20/00
See application file for complete search history.

(56) References Cited

U.S. PATENT DOCUMENTS

| | | | |
|---|---|---|---|
| 9,946,173 B2 * | 4/2018 | Funayoshi | G03F 7/0002 |
| 10,189,983 B2 | 1/2019 | Wada et al. | |
| 11,333,896 B2 * | 5/2022 | Godet | G02B 27/0944 |
| 2008/0055581 A1 | 3/2008 | Rogers et al. | |
| 2009/0098340 A1 | 4/2009 | Campos et al. | |
| 2015/0368453 A1 | 12/2015 | Wada et al. | |
| 2019/0330482 A1 | 10/2019 | Williams | |
| 2020/0004029 A1 | 1/2020 | Godet et al. | |

OTHER PUBLICATIONS

CAOA (Canadian Office Action) issued Sep. 6, 2024 for corresponding application No. 3,176,451.

* cited by examiner

*Primary Examiner* — John Bedtelyon
(74) *Attorney, Agent, or Firm* — Tarolli, Sundheim, Covell & Tummino LLP

(57) ABSTRACT

A method of making a photonic integrated circuit (PIC) is provided. The method comprises depositing a functional resist material layer over a substrate, disposing and pressing a stamp with a plurality of nanopatterns into the functional resist material for a period of time, and removing the stamp from the functional resist material to provide nanofeatures that are inverted versions of the nanopatterns, wherein the nanofeatures form one or more optical elements.

10 Claims, 3 Drawing Sheets

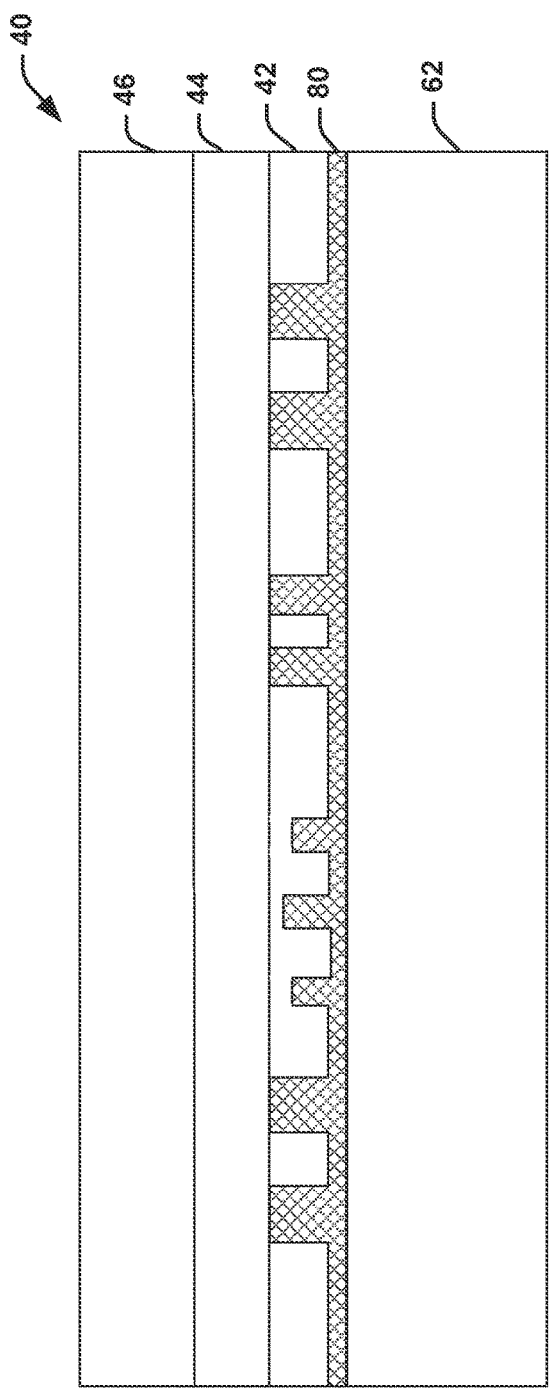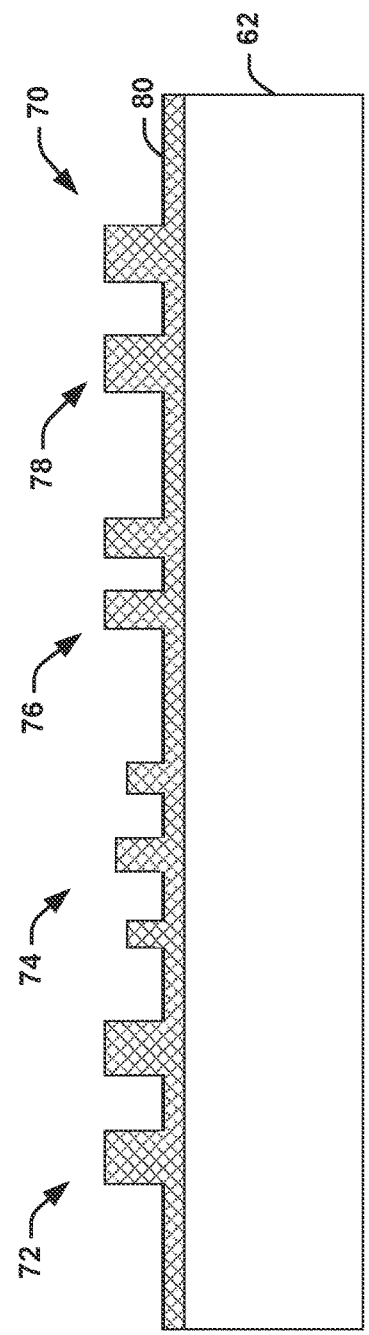

NANOIMPRINTED PHOTONIC INTEGRATED CIRCUITS

RELATED APPLICATIONS

This application claims priority from U.S. patent application Ser. No. 17/508,030, filed 22 Oct. 2021, which is incorporated herein in its entirety.

TECHNICAL FIELD

The present disclosure relates generally to photonic circuits, and specifically to nanoimprinted photonic integrated circuits.

BACKGROUND

A photonic integrated circuit (PIC) or integrated optical circuit is a device that integrates multiple photonic functions into a single device, and as such is similar to an electronic integrated circuit. The major difference between the two is that a photonic integrated circuit provides functions for information signals imposed on optical wavelengths typically in the visible spectrum or near infrared 850 nm-1650 nm, although longer wavelengths (mid-wave or long-wave infrared) are possible with alternative materials. Photonic integrated circuits (PICs) enable rearchitecting conventional bulky free-space optical designs into tightly coupled microdevices, which are typically arrayed in quantity over a wafer for ease of production prior to dicing and packaging. PICs enable sensors and instruments with substantially reduced size, weight, power, and cost relative to standard optical benches without sacrificing system performance. PICs are a critical technology which are at the core of miniaturized integrated instruments.

PICs are fabricated using standard microelectronics processes which typically involve a repeated series of high-precision aligned lithography steps due to the combination of macroscopic (cm-scale), microscopic (micron-scale) and nanoscopic (nm-scale) patterning required in all three dimension. As a result of these multiple length scales, two or more processes and instruments in specialized high-cleanliness facilities are frequently required to fabricate devices (e.g. optical lithography and electron beam lithography, along with associated etch/deposition processing). All of these various processes need to be precisely aligned and tightly calibrated to minimize device-to-device variability, both within single wafers and across multiple wafer production runs.

SUMMARY

In one example, a photonic integrated circuit (PIC) is provided that comprises a substrate, and a nanoimprinted resist structure overlying the substrate. The nanoimprinted resist structure includes a plurality of nanofeatures that form one or more optical elements.

In another example, a method of making a photonic integrated circuit (PIC) is provided. The method comprises depositing a functional resist material layer over a substrate, disposing and pressing a stamp with a plurality of nanopatterns into the functional resist material for a period of time, and removing the stamp from the functional resist material to provide nanofeatures that are inverted versions of the nanopatterns, wherein the nanofeatures form one or more optical elements.

BRIEF DESCRIPTION OF THE DRAWINGS

FIG. 4 illustrates a cross-sectional view of the example stamp of FIG. 2 disposed on the example nanoimprint resist material layer of FIG. 3.

FIG. 5 illustrates a cross-sectional view of a resultant example single nanoimprint resist structure with a plurality of optical elements formed from nanofeatures after removal of the stamp of FIG. 2.

DETAILED DESCRIPTION

Figure 1:
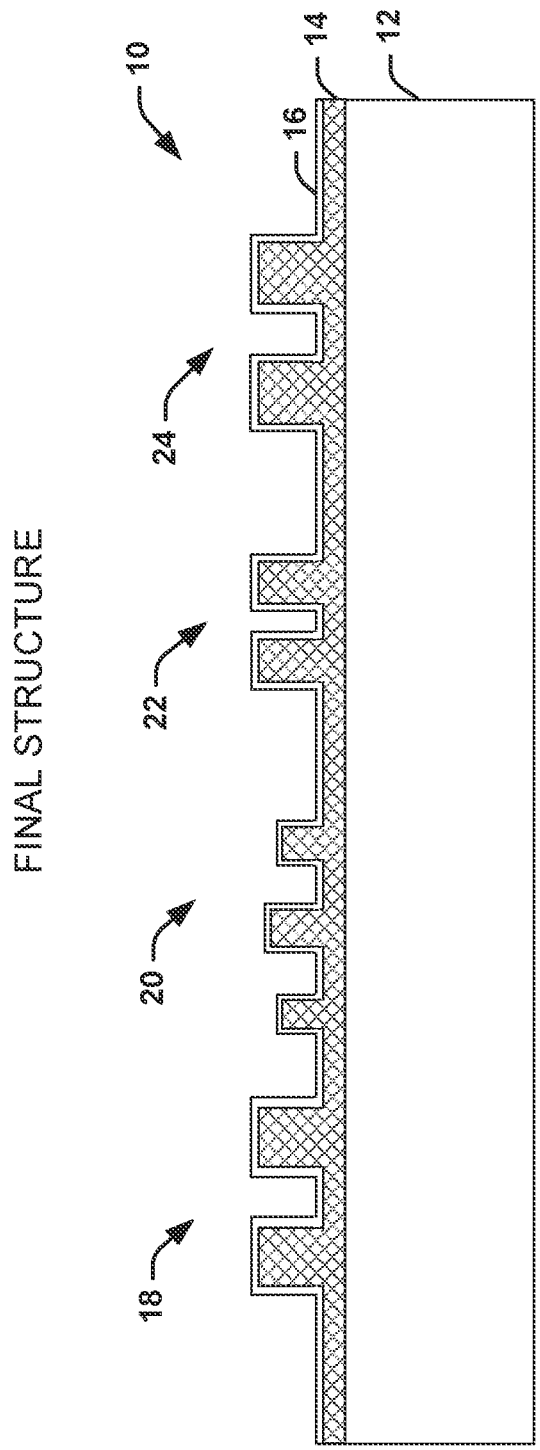
FIG. 1 illustrates a cross-sectional view of an example PIC device having nanofeatures that form a plurality of optical elements formed in a single nanoimprint resist structure.

A photonic integrated circuit (PIC) device is formed by stamping photonic elements into a nanoimprint functional resist disposed on a substrate (e.g., wafer, film, plate). The resultant PIC device with photonic elements stamped into a nanoimprint functional resist encapsulates a plurality of optical elements (e.g., waveguides, tapers, transitions, couplers, filters) having both larger features (e.g., centimeters, millimeters) and smaller features (e.g., microns, nanometers) in a three-dimensional arrangement (e.g., multiple heights lengths and widths). The optical elements can be linear, tortuous, and/or dendritic with tailored transitions among the various length scales. The substrate can be formed of a material (e.g., glass) that has a lower refractive index (e.g., 2% to 50% lower) than the nanoimprint resist. The nanoimprint resist can be a sol-gel resist such as silica, titanium oxide ($TiO_2$), or a loaded sol-gel such as titanium oxide particles or semiconductor particles embedded in a nanoimprint resist (e.g., Amonil UV nanoimprint resist, titanium oxide resist). The nanoimprint resist has a relatively high refractive index (e.g., greater than 1.7 and less than 4.0) with a low optical loss.

A fabrication methodology of forming a silicon 'master' photonic circuit can be employed using traditional techniques to generate a master stamp that is an inverted version of the master photonic circuit. The photonic circuit is then reproduced by placement of the master stamp in a high-index nanoimprint functional resist. This single-step imprint technique allows the fabrication of photonic integrated circuits with reduced cost and improved reproducibility. By using nanoimprint functional resists fabricated of IR transparent materials, it is possible to use this technique for mid-wave infrared (MWIR) PICs. The nanoimprinted resist can be self-curing or formed of a photo-curable or thermally-curable resist.

Traditional techniques require multiple expensive tools for fabricating large and small scale devices into a single PIC. Traditional techniques also require using different layers and calibration of etches of these layers for multiple chips. Calibration over many devices is very difficult and may result in the scrapping or degradation of many PICs over a fabrication lot. A single master stamp allows for the repeatability of similar quality PICs over a fabrication lot with the formation of both large features and small features of multiple dimensions in a single process. The master stamp can be replicated and distributed to simpler facilities that can stamp wafers under ambient conditions without the expensive equipment found in a high performance semiconductor foundry.

Stamps can be made from hard (e.g., semiconductor, metal, or glass) or soft materials (e.g., elastomeric). In one example, a single nanoimprint stamp encompasses nanopatterns to pattern features that form each of the plurality of optical elements. In another example, the single nanoimprint stamp is an elastomeric stamp. The elastomeric stamp can be made by a trilayer of materials with a high Young's modulus (E=10-100 MPa) top polymer layer that encompasses the plurality of optical elements (nanopatterns), followed by a lower Young's modulus (E=2-10 MPa) intermediate polymer layer disposed on a glass plate. For example, the nanoimprint stamp can be a specially prepared tri-layer system comprised of a hard polydimethylsiloxane (PDMS) layer which holds the nanopatterns, a soft PDMS layer to enable conformality to the imprint substrate, and a flexible glass backing layer to both facilitate handling and ensure long-range dimensional stability. Stamp lifetimes can be on the order of 700-1000 wafers prior to replacement and can be produced inexpensively since an original master wafer can be reused without degradation.

The nanoimprint resist in this approach serves as a functional optical component of the final photonic circuit rather than a sacrificial masking layer as in traditional lithographies. The process also allows the transfer of structures across a wide range of length scales and dimensions into the resist, enabling structures where both nano-, micro-, and macro-scale features are simultaneously replicated. The nanoimprinted photonic base layer is compatible with standard fabrication processes. It can stand alone or be planarized and overlaid with other electrical and/or electro-optical layers.

FIG. 1 illustrates an example of a PIC device 10 having nanofeatures that form a plurality of optical elements formed in a single nanoimprint resist structure 14. The plurality of optical elements can form optical devices such as waveguides, splitters, combiners, bragg reflectors, lenses and other optical devices. The single nanoimprint resist structure 14 is disposed on a substrate 12 (e.g., wafer, film, plate). The substrate 12 can be formed of a material (e.g., glass, quartz, silicon, sapphire) having a refractive index (e.g., less than or equal to about 1.5) that is lower than the refractive index of the nanoimprint resist structure 14 (e.g., from about 1.7 to about 4.0). The single nanoimprint resist structure 14 can be a sol-gel resist such as silica, titanium oxide ($TiO_2$), or a loaded sol-gel such as titanium oxide particles or semiconductor particles embedded in a nanoimprint resist (e.g., Amonil UV nanoimprint resist). The single nanoimprint resist structure 14 has a relatively high refractive index with a low optical loss. The nanoimprinted resist can be self-curing or formed of a photo-curable or thermally-curable resist.

The plurality of optical elements are formed from nanofeatures embedded into the nanoimprint resist structure 14. The nanofeatures are a result of a stamping process employing a stamp that includes nanopatterns that are inverted versions of the nanofeatures. The features can include large scale or micro-scale features (e.g., millimeters or micrometers) 18 and 24 and small scale or nano-scale features 20 and 22 (e.g., nanometers). As illustrated in FIG. 1, nano-scale features 20 have varying heights that are different than nano-scale features 22 and micro-scale features 18 and 24. Therefore, the nanopatterns can provide for a three-dimensional arrangement of nanofeatures of varying widths, lengths and heights. This three-dimensional arrangement is provided in a single stamping process as opposed to multiple lithography processes of different layers required in the fabrication of conventional PIC devices. An encapsulation layer 16 overlies the nanofeatures of the nanoimprint resist structure 14. The encapsulation layer 16 can be a lower-index sol-gel layer to provide both mechanical or environmental protection and planarization for subsequent device layers.

Nanoimprint lithography can be performed with either a hard (semiconductor, metal, or glass) stamp or a soft polymeric stamp. While hard stamps have been used to demonstrate the highest resolution patterning, they are accompanied by significant disadvantages: challenging removal from the imprinted substrate, fragility during handling, susceptibility to irreversible damage from dust contamination, processing at elevated temperatures and/or pressures, and difficulties in scaling due to the requirement of highly planar substrates.

Soft stamps address these challenges presented by hard stamps, while supporting sub-30 nm resolutions exceeding the requirements of even visible-light PICs. Soft stamps support room temperature application and curing which can be accelerated using flood UV illumination. The polymeric stamp material also supports sufficient out-of-plane deformation to bend over dust contamination, significantly improving stamp lifetime by reducing degradation as a function of number of imprints performed. These stamps also resist damage from handling, and can be reproduced inexpensively.

Figure 2:
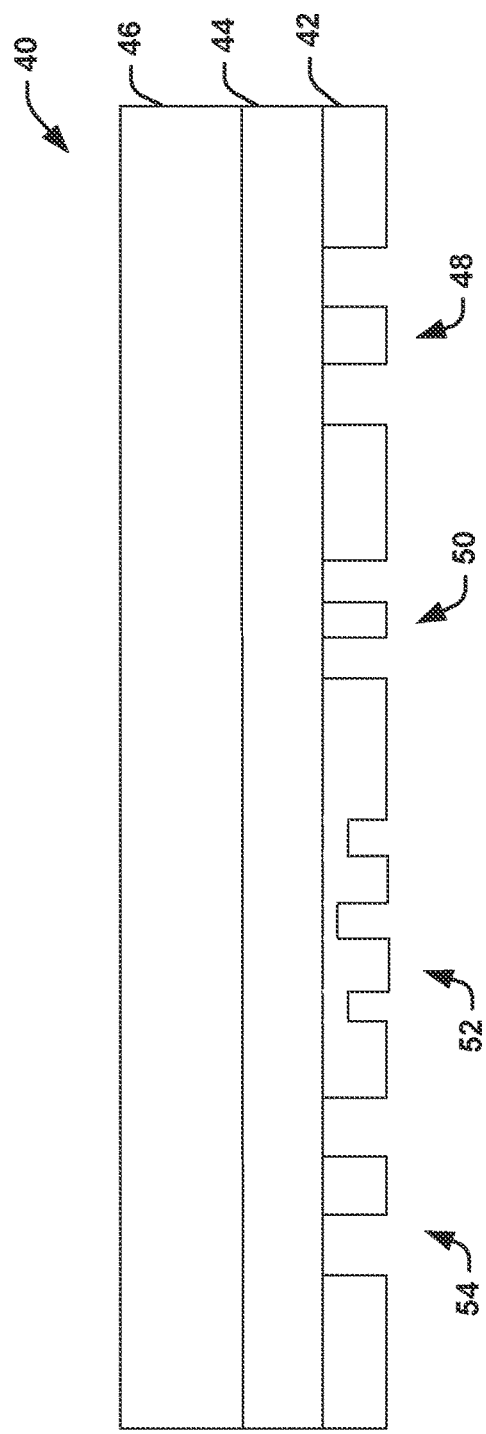
FIG. 2 illustrates a cross-sectional view of an example master pattern stamp having a plurality of nanopatterns.

FIG. 2 illustrates an example of a master pattern stamp 40 having a plurality of nanopatterns. The plurality of nanopatterns are inverted versions of nanofeatures to be stamped into a nanoimprint functional resist to form a plurality of optical elements from the nanofeatures. In one example, the single nanoimprint stamp 40 is an elastomeric stamp. The elastomeric stamp includes soft or low modulus polymer layer 44 overlying a substrate layer 42 and a hard or high modulus polymer layer 46 overlying the low modulus polymer layer 44. The substrate layer 42 can be a flexible glass backing layer to both facilitate handling and ensure long-range dimensional stability. The low modulus polymer layer 44 can be a soft PDMS layer to enable conformality to the imprint substrate. The high modulus layer 46 can be a hard PDMS layer that holds the nanopatterns and overlies the soft PDMS layer 44. Stamp lifetimes can be on the order of 700-1000 imprints prior to replacement and can be produced inexpensively since an original master wafer can be reused without degradation to form a number of stamps.

The patterns can include large scale or micro-scale patterns (e.g., centimeters, millimeters) 48 and 54 and small scale or nano-scale patterns 50 and 52 (e.g., nanometers) to form large scale or micro-scale features (e.g., centimeters, millimeters) and small scale or nano-scale features (e.g., nanometers) in a stamped nanoimprint resist structure. As illustrated in FIG. 2, nanopatterns 52 have varying heights that are different than nano-scale patterns 50 and micro-scale patterns 48 and 54 to provide features of varying heights, lengths and widths on the stamped nanoimprint resist structure.

Figure 3:
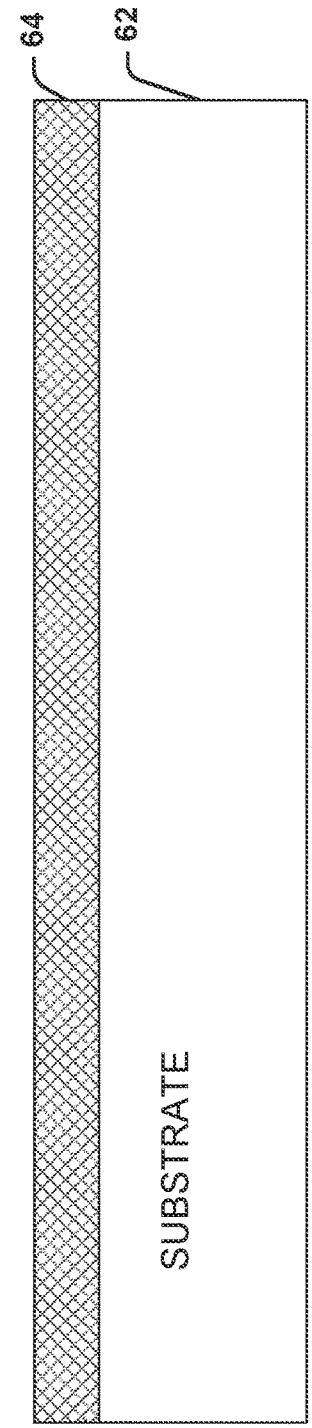
FIG. 3 illustrates a cross-sectional view of an example PIC device in its early stages of fabrication.

Turning now to FIGS. 3-5, fabrication is discussed in connection with formation of the PIC device 10 of FIG. 1. FIG. 3 illustrates a cross-sectional view of a PIC device in its early stages of fabrication. A nanoimprint resist material layer 64 overlies a substrate 62. The nanoimprint resist material layer 64 may be formed over the substrate 62 via spin-coating or spin casting deposition techniques similar to a photoresist material resist deposition process. However, the nanoimprint resist material layer 64 is a high-index functional nanoimprint resist applied as a liquid that when stamped and cured can provide functional optical elements. The nanoimprint resist material layer 64 can have a thickness of about 100 nm to about 250 nm. The substrate 62 can be formed of a material (e.g., glass) that has a lower refractive index (e.g., 2% to 50% lower) than the nanoimprint resist material layer 62. The nanoimprint resist material layer 62 can be a sol-gel resist such as silica, titanium oxide ($TiO_2$), or a loaded sol-gel such as titanium oxide particles or semiconductor particles embedded in a nanoimprint resist material (e.g., Amonil UV nanoimprint resist, titanium oxide resist). The nanoimprint resist material layer has a relatively high refractive index (e.g., greater than 1.7 and less than 4.0) with a low optical loss.

FIG. 4 illustrates a cross-sectional view of the stamp 40 of FIG. 2 disposed on the nanoimprint resist material layer 64 of FIG. 3. After the stamp 40 is disposed on the nanoimprint resist material layer 64, pressure is placed on the back of the stamp 40 to submerge the pattern of the stamp 40 into the nanoimprint resist material layer 64. The liquid nanoimprint resist material pulls the stamp down by capillary forces causing the liquid nanoimprint resist material to flow (e.g., about 5-10 microns) filling the openings in the pattern of the stamp 40. The nanoimprint resist material layer 64 can cure at room temperature. Alternatively, the nanoimprint resist material layer 64 can be cured faster by subjecting the nanoimprint resist material layer 64 to elevated temperatures. Furthermore, the nanoimprint resist material layer 64 can be photocured by subjecting the nanoimprint resist material layer 64 to ultra-violet (UV) light through the stamp 40. The nanoimprint resist material layer 64 can take anywhere from about 20 seconds to about 20 minutes to cure based on the selected process.

Once the nanoimprint resist material layer 64 is cured, the stamp can be removed to provide the resultant structure of FIG. 5. The stamp 40 is self-cleaning such that the solvent from the nanoimprint resist evaporated into the air and not into the stamp 40. The resultant structure of FIG. 5 provides a plurality of optical elements formed from nanofeatures embedded into the nanoimprint resist structure 64. The nanofeatures include large scale or micro-scale features (e.g., centimeters, millimeters or micrometers) 72 and 78 and small scale or nano-scale features 74 and 76 (e.g., nanometers). The nano-scale features 74 have varying heights that are different than nano-scale features 76 and micro-scale features 72 and 78. Therefore, the nanopatterns can provide for a three-dimensional arrangement of nanofeatures of varying widths, lengths and heights. The nanoimprinted resist structure can be formed of a photo-curable or thermally-curable resist. A resultant resist top layer 80 resides over the substrate around the nanopatterns as a result of the stamping process that can be removed or utilized for other features and/or connections.

After imprinting, the functional resist layer can be either used as-is or modified through postprocessing. Processes known to improve either mechanical or optical properties include calcination, vacuum annealing, or atomic layer deposition. Postprocessing can also include superstrate deposition or encapsulation with a lower-index sol-gel layer to both provide mechanical or environmental protection and planarization for subsequent device layers to provide a structure similar to the structure illustrated in FIG. 1. Integration can be accomplished using established techniques for patterning and connecting readout integrated circuitry (ROIC), detectors, and other required components.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A photonic integrated circuit (PIC) comprising:
a substrate;
a nanoimprinted resist structure overlying the substrate, the nanoimprinted resist structure having a plurality of features that form one or more optical elements; and
an encapsulation layer overlying the nanoimprinted resist structure, wherein the encapsulation layer has a thickness that is less than a height of all the plurality of features.

2. The PIC of claim 1, wherein the encapsulation layer has a lower refractive index than the nanoimprinted resist structure.

3. The PIC of claim 2, wherein the nanoimprinted resist structure is inorganic and primarily comprised of silica, titanium oxide ($TiO_2$), or titanium oxide particles or semiconductor particles embedded in a sol-gel.

4. The PIC of claim 1, wherein the nanoimprinted resist structure is formed of a photo-curable or thermally-curable resist.

5. The PIC of claim 1, wherein the nanoimprinted resist structure has a refractive index greater than 1.5 and less than 4.0.

6. The PIC of claim 5, wherein the substrate has a refractive index less than 1.5.

7. The PIC of claim 6, wherein the substrate is formed of one of glass, quartz, silicon, and sapphire.

8. The PIC of claim 1, wherein the single nanoimprint resist structure includes both centimeters, millimeters or micrometers features and nanometers features having varying heights.

9. The PIC of claim 1, wherein the plurality of nanofeatures of the single nanoimprint resist structure is formed from a single stamp having a plurality of nanopatterns that are inverted versions of the plurality of nanofeatures.

10. The PIC of claim 9, wherein the single stamp is a soft polymeric stamp.

* * * * *